Dec. 10, 1957     V. C. SMITH     2,816,064
WATER DISTILLATION
Filed Oct. 24, 1955
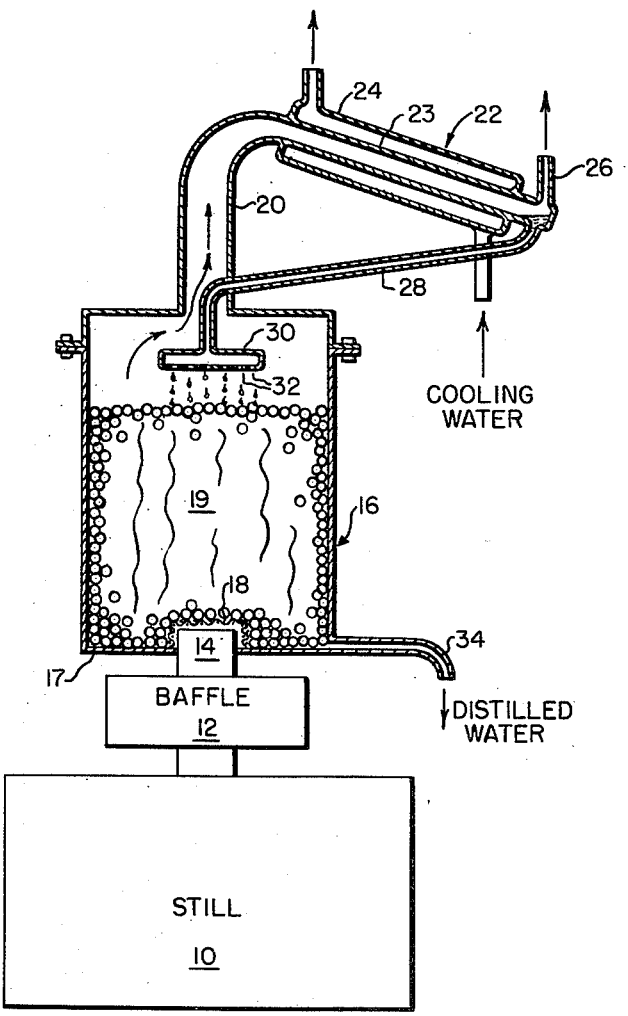
INVENTOR.
VERITY C. SMITH
BY
ATTORNEYS

2,816,064
WATER DISTILLATION

Verity C. Smith, Dedham, Mass., assignor to Barnstead Still and Sterilizer Co., Boston, Mass., a corporation of Massachusetts Application October 24, 1955, Serial No. 542,316

6 Claims. (Cl. 202—40)

This invention relates to the distillation of water and provides a method and apparatus for producing water of extremely high purity.

The process of water distillation consists primarily of the vaporization of water to form water vapor and the condensation of the vapor back to water. The condensation produced by merely these two steps is generally not of extreme purity, since solid dissolved impurities may have been carried over into the distillate by minute particles of water having become entrained in the vapor, and by gases present in the water also carried along with the vapors and appearing in the distillate. To produce water of the highest purity, for instance water having a resistivity greater than 500,000 ohm-cm., entrained particles must be removed from the vapors and dissolved gases must be separated from the distillate.

In prior art practice, entrained particles are generally removed by passing the water vapor through a baffle, which consists of an arrangement of partition members which form a tortuous path through which the vapors are passed with numerous deflections in its course. The fluid thus flows against the walls of the path and there deposits most of the entrained particles. The removal of gases which are also originally present in the water being distilled is most commonly accomplished by subjecting the distilled water to a vaccum to cause these gases to escape under their own pressure.

The apparatus and process of the present invention provides for the removal of dissolved gases and for extremely thorough removal of all impurities in conjunction with and as part of the distillation process. It thus avoids the necessity of subsequently treating the water to enhance its purity and also eliminates the expense and trouble of further treatments. The system is simple and inexpensive and requires a minimum of maintenance and adjustment. By its use, water having a resistivity of 1,000,000 ohm-cms. or more can easily be produced under conditions which ordinarily yield water having a conductivity of about 500,000 ohm-cms.

In the treatment provided by this invention the vapor from the still, after its passage through a baffle typically of conventional design, is passed upwardly through a column or tower having within it means for bringing the rising vapor into intimate contact over a large surface with a downflowing liquid. From the top of the tower, the vapor is passed into a condenser which is vented to permit the escape of uncondensed gas. The condensate is flowed down the column and is collected from the bottom.

The treatment is thus characterized by the bringing together into intimate contact of countercurrent streams of vapor and condensate with the result of significantly increased purification of the condensate. In preferred embodiments, the column is filled with packing material defining numerous flow paths through which vapor rising is brought into contact with a large surface of liquid descending, and connects with a condenser which slopes downwardly from its entrance so that the condensate drains away from the rising vapor. When so constructed the uncondensed gases, which are also generally heavier than the water vapor, readily accumulate at the low discharge end of the condenser from which they may most readily be vented. The condensate from the discharge end is then collected and flowed back to the top of the column and discharged through a distributor providing even flow of the condensate over the packing.

A further feature of preferred embodiments consists in providing a vapor inlet in the form of an upwardly extending conduit which terminates above the bottom of the column. The condensate may then be collected on the bottom of the column with only that descending from above the inlet conduit flowing down and out through it. A shield may be provided to prevent this limited flow of condensate out the inlet conduit, but this flow is seen as being of some benefit in assuring the removal of the last traces of entrained matter from the vapor entering the column.

The presently preferred embodiment of this invention is described in detail below with reference being made to the accompanying drawing which shows the embodiment in elevational cross-section.

The preferred embodiment is typical of a water distillation system incorporating this invention and is shown installed following a still 10 and baffle 12, each of which may be of conventional design and forms by itself no part of this invention. The still 10 receives the water to be distilled and includes heating means for converting the water to vapor which passes upwardly through the baffle 12.

The vapor from the baffle 12 is flowed into a column 16 through an inlet conduit 14 which leads upwardly through and terminates above the bottom 17 of the column. The column 16 is filled to a substantial distance above the upper end of the inlet conduit 14 with packing material 19 such as pebbles, Raschig rings, Berl saddles or other material defining plural flow paths through the column, the packing over the end of the inlet conduit 14 being supported on a screen 18 which covers the end of the inlet conduit.

From the top of the column the vapors are passed through an outlet conduit 20 which leads them to the upper inlet end of a condenser 22. The condenser consists typically of an inner metal tube 23 connecting with the outlet conduit and surrounded by a jacket 24 having inlet and outlet means for circulating a cooling medium in out-of-contact heat exchange relation with the vapors in the inner tube 23. As is shown, the inner tube 23 slopes downwardly so that condensate flows away from the vapor outlet and connects at its lower end with an upwardly directed vent opening 26 and a downwardly directed return conduit 28 which leads back to the top of the column 16. The end of the return conduit 28 connects with and supports a distributor head 30 by which the condensate is distributed more or less evenly over the top of the packing material 19 as through appropriately located perforations 32 in the bottom of the distributor head.

A drain 34 at the bottom of the column provides for the removal of the condensate accumulating on the bottom 17.

From the foregoing it will be seen that the vapor from the still 10, after the preliminary removal of entrained particles in the baffle 12, enters the bottom of the column 16 and flows upwardly through the packing material 19 in countercurrent intimate contact with downflowing condensate. A small fraction of condensate drains from above the inlet conduit 14 and drains back through the baffle to the still, and the remainder accumulates on the bottom of the column. The vapor thus first encounters in the region immediately above the inlet conduit condensate which will drain back to the still and not appear in the final product, and any entrained matter still carried by the vapor is largely removed without contaminating the product. The amount of condensate draining through the inlet 14 may of course, be readily controlled by varying the size of the inlet or may be eliminated entirely by providing an appropriate shield over the inlet.

In the column it appears that the last traces of gas are removed from the condensate and they are carried out of the column into the condenser along with the rising vapor.

Some of the gas redissolves in the condensate in the condenser, but this may be kept to a minimum by adjusting the rate of cooling so that the condensate is hot, and preferably so that a small plum of steam is visible at the vent 26. The escape of steam appears to provide a scavenging action which assists in removing the gas. Small amounts of dissolved gas in the condensate are finally removed during its downward flow through the column.

The water produced by the apparatus and process of this invention is of significantly increased purity approaching that obtainable only by treatments much more elaborate. While it is recognized that the prior are is replete with numerous processes in which a rising vapor is brought into intimate contact with a downflowing liquid, no cases are known wherein distilled water is subjected to the action of its rising vapor in the manner herein disclosed.

Although this invention has been described in detail with reference to its presently preferred embodiment, it is contemplated that modifications will occur to those skilled in the art and may be made without departing from the scope of the invention.

Having thus disclosed my invention and described in detail a preferred embodiment thereof, I claim as new and desire to secure by Letters Patent:

1. Water distillation apparatus comprising a column having a lower vapor inlet and an upper vapor outlet with means therein for bringing rising vapors into intimate contact with a downflowing liquid, a condenser connecting with said upper vapor outlet adapted to condense water vapor from said column to condensate, said condenser being vented to the atmosphere to permit the escape of uncondensed gas, means for collecting the condensate from said condenser and flowing it down said column, whereby the condensate is flowed downwardly through the column in intimate countercurrent contact with rising vapor, and means for collecting the condensate as product after contact with vapor.

2. Water distillation apparatus comprising a column having a lower vapor inlet and an upper vapor outlet with means therein for bringing rising vapors into intimate contact with a downflowing liquid and with drainage means intercepting the downflowing liquid communicating with an outlet, a condenser connecting with said upper vapor outlet adapted to condense water vapor from said column to condensate, said condenser being vented to the atmosphere to permit the escape of uncondensed gas, liquid channeling means adapted to collect all the condensate from said condenser leading from the outlet of said condenser to the top of said column and discharging therein, whereby all the condensate is flowed downwardly through the column in intimate countercurrent contact with rising vapor.

3. Water distillation apparatus comprising a column having a lower vapor inlet and an upper vapor outlet with means therein for bringing rising vapors into intimate contact with a downflowing liquid and with drainage means intercepting the downflowing liquid communicating with an outlet, a condenser adapted to condense water vapor from said column to a liquid, said condenser having an inlet for vapor connection with the outlet from said column, and an outlet at a level lower than said inlet whereby condensate drains away from said inlet, said condenser being vented at its outlet end to permit the escape of uncondensed gas, means for collecting all the condensate from said condenser leading from the outlet of said condenser to the top of the column and discharging therein, whereby all the condensate is flowed downwardly through the column in intimate countercurrent contact with rising vapor.

4. Water distillation apparatus comprising a column having a lower vapor inlet defined by an inlet conduit extending into said column and terminating above the bottom thereof, an upper vapor outlet defined by conduit communicating with the top of said column, and an outlet at the bottom of said column communicating therewith at a level below the top of the inlet conduit; packing material in said column defining plural flow paths through which vapor rising in said column is brought into intimate contact with liquid flowing downwardly through said column and liquid distributing means over said packing material adapted to supply a liquid for downward flow through said material; a condenser adapted to condense water vapor from said column, said condenser having an inlet for vapor connecting with the outlet from said column at a level above the uppermost part of the packing material and an outlet at an elevation lower than said inlet and above the uppermost part of the packing material whereby condensate drains away from said inlet, said condenser being vented at its outlet end to permit the escape of uncondensed gas, means for collecting all the condensate from said condenser leading from the outlet of said condenser to said liquid distributing means, and means for supplying vapor to said lower vapor inlet, whereby all the condensate is flowed downwardly through the column in intimate countercurrent contact with rising vapor.

5. The method of purifying water comprising supplying heat to the water to convert it to vapor, passing the vapor upwardly through a column adapted to bring the vapors into intimate contact with a downflowing liquid, condensing the vapor after its passage through said column to form condensate, separating uncondensed gases from said condensate, passing all of said condensate down said column in intimate contact with the vapor passing upwardly through said column, and collecting said condensate at a lower part of said column.

6. In the method of purifying water by distillation wherein water is converted to vapor and the vapor is subsequently condensed to condensate, the improvement comprising passing the vapor in intimate counter-current contact with condensate, condensing the vapor after said contact to form condensate while venting uncondensed gases from contact with the condensate, passing the condensate in intimate counter-current contact with vapor and finally collecting the condensate as product after contact with vapor.

References Cited in the file of this patent

UNITED STATES PATENTS 698,724     Murphy   --------------- Apr. 29, 1902